United States Patent
Ledoux et al.

(10) Patent No.: US 9,284,232 B2
(45) Date of Patent: Mar. 15, 2016

(54) SAFE BLENDS OF AMMONIUM NITRATE (AN) WITH UREA, OR OF AN AN-COMPRISING PRODUCT WITH A UREA-COMPRISING PRODUCT

(71) Applicant: YARA INTERNATIONAL ASA, Oslo (NO)

(72) Inventors: Francois Ledoux, Cormeilles en Parisis (FR); Erika Winne, Ghent (BE); Erik C. Nygaard, Porsgrunn (NO)

(73) Assignee: YARA INTERNATIONAL ASA, Oslo (NO)

( * ) Notice: Subject to any disclaimer, the term of this patent is extended or adjusted under 35 U.S.C. 154(b) by 0 days.

(21) Appl. No.: 14/415,809

(22) PCT Filed: Aug. 28, 2013

(86) PCT No.: PCT/EP2013/067798
§ 371 (c)(1),
(2) Date: Jan. 20, 2015

(87) PCT Pub. No.: WO2014/033159
PCT Pub. Date: Mar. 6, 2014

(65) Prior Publication Data
US 2015/0175491 A1 Jun. 25, 2015

(30) Foreign Application Priority Data
Aug. 29, 2012 (NO) .................................. 20120971

(51) Int. Cl.
*C05C 1/00* (2006.01)
*C05C 9/00* (2006.01)
*C05C 3/00* (2006.01)
*C05G 3/00* (2006.01)

(52) U.S. Cl.
CPC ... *C05C 1/00* (2013.01); *C05C 3/00* (2013.01); *C05C 9/005* (2013.01); *C05G 3/0023* (2013.01); *C05G 3/0041* (2013.01)

(58) Field of Classification Search
None
See application file for complete search history.

(56) References Cited

U.S. PATENT DOCUMENTS

| 2,214,354 | A | | 9/1940 | Snelling | |
|---|---|---|---|---|---|
| 3,070,435 | A | | 12/1962 | Reusser et al. | |
| 4,026,696 | A | * | 5/1977 | Young | 71/28 |
| 4,316,736 | A | | 2/1982 | Van Hijfte et al. | |
| 6,312,493 | B1 | * | 11/2001 | Eltink et al. | 71/28 |
| 7,416,785 | B2 | * | 8/2008 | Mente | 428/407 |
| 8,858,673 | B2 | * | 10/2014 | Kweeder | 71/31 |
| 2008/0223098 | A1 | | 9/2008 | Taulbee | |
| 2010/0263420 | A1 | * | 10/2010 | Flore et al. | 71/28 |
| 2010/0326152 | A1 | * | 12/2010 | Mente | 71/27 |
| 2011/0154874 | A1 | * | 6/2011 | Rahn et al. | 71/21 |
| 2013/0152649 | A1 | * | 6/2013 | Kweeder et al. | 71/28 |
| 2014/0260470 | A1 | * | 9/2014 | Taulbee | 71/30 |

FOREIGN PATENT DOCUMENTS

| EP | 0 223 276 | 5/1987 |
|---|---|---|
| EP | 2 431 346 | 3/2012 |
| FR | 2.125.616 | 9/1972 |
| GB | 372388 | 5/1932 |
| GB | 373211 | 5/1932 |
| GB | 1101638 | 1/1968 |
| WO | 97/14665 | 4/1997 |
| WO | 00/07938 | 2/2000 |
| WO | 2004/000759 | 12/2003 |
| WO | 2007/084873 | 7/2007 |

OTHER PUBLICATIONS

International Search Report and Written Opinion issued Mar. 12, 2014 in International (PCT) Application No. PCT/EP2013/067798.
Norwegian Search Report issued Aug. 29, 2012 in Application No. 20120971 with English translation.
"Guidance for the compatibility of Fertilizer Blending Materials", European Fertilizer Manufacturers' Association, Jun. 2006, pp. 1-12.

\* cited by examiner

*Primary Examiner* — Wayne Langel
(74) *Attorney, Agent, or Firm* — Wenderoth, Lind & Ponack, L.L.P.

(57) ABSTRACT

The present invention relates to a solid blend of urea based and ammonium nitrate based particles, the blend comprising ammonium nitrate based particles with salts able to bind crystallization water and urea particles with ammonium sulphate.

11 Claims, No Drawings

SAFE BLENDS OF AMMONIUM NITRATE (AN) WITH UREA, OR OF AN AN-COMPRISING PRODUCT WITH A UREA-COMPRISING PRODUCT

FIELD OF THE INVENTION

The present invention concerns solid nitrogen fertilizers having improved properties.

BACKGROUND

Urea and ammonium nitrate are today the two main sources of nitrogen to world agriculture. Mainly used as straight nitrogen fertilizer, they are also currently combined into liquid fertilizer (UAN solutions, (urea ammonium nitrate)).

Urea and ammonium nitrate are considered as incompatible to prepare in solid blends. It is referred to proceeding n° 558 from the International Fertiliser Society in London: "Introduction to guidelines for the production and handling of blended fertilisers", presented on Apr. 14, 2005.

This is due to the highly hygroscopic double salts they form, when in contact with each other (see table hereunder). Formation of such salts leads to an extra liquid phase, absorption of water from surrounding atmosphere and in extreme cases, mud formation of the whole blend.

Urea and ammonium nitrate products of good quality have a low water content. They comprise far below 1 weight % of free water, usually some 0.2 weight % free water or less. However, even such small water amounts are sufficient to allow reaction between urea and AN to start and further develop, leading to caking and/or mud. This reaction can occur even when the product cannot absorb any water from surrounding atmosphere when bagged or stored in closed box, simply from the water content of the products before blending. The higher the storage temperature, the more the blend would then dissolve in its own water content.

Table 1 shows the critical relative humidity at 30° C. for various products.

TABLE 1

| Product: | urea | Ammonium nitrate | Urea-ammonium nitrate double salts |
| --- | --- | --- | --- |
| Critical relative humidity at 30° C. | ~75% | ~60% | Below 20% |

The critical relative humidity of a fertilizer is defined as the atmospheric humidity at which the solid product absorbs exponentially water from atmosphere.

These properties of high solubility/high hygroscopicity allow manufacturing of UAN solutions, which are popular liquid fertilizers presenting numerous advantages, a non-freezing fertilizer combining various sources of nitrogen (ammonium, nitrate, urea) at high nutrient concentration. Since their salt out temperature is well below 0° C., standard UAN grades are 28%, 30% and 32% nitrogen. In tropical countries, not subjected to freeze, even more concentrated solutions can be used. Table 2 shows the composition and crystallisation temperature for different UAN grades.

TABLE 2

| UAN grade: | 28% N | 30% N | 32% N |
| --- | --- | --- | --- |
| Weight % AN | 40.1 | 42.2 | 43.3 |
| Weight % urea | 30.0 | 32.7 | 35.4 |
| Weight % water | 29.9 | 25.1 | 20.3 |
| Crystallization temperature ° C. | −18 | −10 | −2 |

The classically accepted incompatibility between ammonium nitrate and urea mixed in dry blends is basically due to the formation of double salts, making such dry blends impossible to produce. To get double salt formation, liquid phase is actually required so that the compound can react together.

OBJECT OF THE INVENTION

One object of the present invention is to obtain solid, stable compatible blends of urea and ammonium nitrate comprising products. Another object of the invention is to produce a fertilizer blend from which nitrate cannot be easily isolated from the other components. A further object of the invention is to obtain a highly concentrated N fertilizer, comprising large amounts of nitrate and providing right ratios of urea to AN in order to be safe. Still a further object of the invention is to obtain a blend that cannot be sensitized by fuel addition.

SUMMARY OF THE INVENTION

The objects of the invention are obtained by the product and method described in the following and as defined by the appended claims.

DETAILED DESCRIPTION OF THE INVENTION

The invention concerns a solid blend of urea based particles and ammonium nitrate based particles, and a method for manufacturing of the blend. The ammonium nitrate based particles comprise a salt that is able to bind crystallisation water, selected from magnesium nitrate, magnesium sulphate, aluminium sulphate or mixtures thereof. The content of salt is 0.1-50 weight %, preferably 0.5-3 weight % of the ammonium nitrate based particles. The urea based particles contain ammonium sulphate, either in the mass of the particle (for instance distributed throughout the particle) or as an external layer. It is preferred that the parts of the urea based particles comprising ammonium sulphate, which are in contact with ammonium nitrate based particles, contain 42% N or less. To obtain a safe blend the blend must contain more than 40 weight % of urea particles with ammonium sulphate (AS). It is preferred that the blend comprises a colouring agent distributed throughout the particles or at the surface. Preferably the particles in the blend have similar size and particle size distribution and particle density within same range. The blend is manufactured by mixing ammonium sulphate with urea, and forming urea based particles having ammonium sulphate distributed throughout the particles; or forming urea based particles comprising an external layer comprising ammonium sulphate; and mixing a salt, able to bind crystallization water, with an ammonium nitrate source and forming ammonium nitrate based particles comprising said salt; and blending the urea based particles and the ammonium nitrate based particles.

The key of the invention is therefore a combined effect of desiccant to limit the liquid phase, and addition of an extra compound, ammonium sulphate, that is compatible with both urea and ammonium nitrate and can avoid the formation of unwanted UAN double salt.

The present invention provides a method of producing a new fertilizers, by efficiently dry-blending urea based and ammonium nitrate based products together into a bagged product that can be stored and handled from production site until the field where spread.

The present invention provides a stable, straight and concentrated N fertilizer, comprising AN in a large amount. Advantageously various sorts of nitrogen are combined in the blend of the present invention, and the blend can be dosed in a way by which a highly safe material is obtained. The blend is very difficult, even to be reprocessed, for misuse as an explosive. Moreover, industrial implementation of such production shall require only limited adaptations of production plants, and thus does not increase production costs significantly.

To produce a good blend of solid fertilizer, some criteria are to be respected, chemical properties on the one hand, physical properties on the other hand. "Chemical properties" mean compatibility of the products, from a safety point of view as well as stability of the blend (e.g. formation of unwanted double salts). "Physical properties" correspond to segregation effect and stratification of the blend, likely to occur if the properties of the blended products are far too different. Blends should ideally be made from particles with identical size and particle size distribution, homogeneous particle density and surface aspect. It is often a weak point of fertilizer blends, when particles in the form of prills, granules, crystalline products or even compacted products are blended together.

Before blending the urea and AN products are particulated by e.g. granulation or prilling. In one aspect of the invention, both urea and AN particles can be produced under similar processes, such as e.g. fluidized bed granulation.

Exiting same type of plants, their physical properties can therefore be well-adjusted, mean size diameter, particles size distribution, and surface aspect. If sufficient amount of AS (ammonium sulphate) is added into urea to form UAS (urea ammonium sulphate), then the densities of the urea compound and AN-compound can already be very similar, as illustrated in the table below.

TABLE 3

| Product | Urea granules | AN/CAN | UAS |
|---|---|---|---|
| Usual bulk densities kg/m3 | ~730-780 | ~900-1100 | ~750-850 |

If urea is to be blended with e.g. CAN (calcium ammonium nitrate), then it is possible to add some heavy fillers into urea to adjust its density, such as dolomite, sand, gypsum, micas, silicates, etc., but also fertilizers such as e.g. MAP (mono-ammonium phosphate) or DAP (di-ammonium phosphate), adding an extra nutrient to the blend. It is also possible to add some ammonium sulphate into the AN source, as the fluidized bed granulation of AN with some AS leads to a less dense product.

The solid blend further comprises stabilising agents such as additives able to bind water in order to avoid the formation of liquid phase. Examples such as magnesium nitrate, aluminium sulphate, magnesium sulphate, etc. It is important to notice that some porous fillers, natural or natural and processed (e.g. acid digestion to create an adequate porous structure) or produced, can present much less water binding capacity than additives, but added in larger amount, typically 5 to 99%, give the same effect. For urea-ammonium nitrate blends according to the present invention, magnesium nitrate is the preferred ammonium nitrate stabilizer. The preference of magnesium nitrate is due to its high desiccant effect, large water binding capacity and easiness of handling in the fertilizer manufacturing plant.

In one additional aspect of the present invention a colouring agent is added in both or on both ammonium nitrate based and urea based granules. The colouring agent is added in order to achieve a homogeneous blend and make separation based on colour screening impossible.

An advantage of the present invention is that it can easily be implemented since process modification required to produce blendable ammonium nitrate and urea granules are limited adaptations, e.g. mixing vessel and slurry pump. Even end-of-the-pipe options can be advantageously used, such as coating existing urea granules with a UAS slurry of the right composition. A coating approach presents moreover the advantage to keep the AS amount in the product as low as possible, if S-fertilization is not specially aimed, since only the external layer of the granule needs to be treated while the core of the granule can remain pure urea.

The adaptations to produce blendable ammonium nitrate and urea granules can be made without loading extravagantly production costs and thereby keeping production costs in accordance to commodities business. Actually granules of urea ammonium sulphate (UAS) are already produced in different plants throughout the world today.

Provided proper production and packaging, the blends according to the present invention can remain stable along the handling chain and for sufficient hours after bag opening to allow spreading on the field. Just like the use of e.g. AN granules stabilized with magnesium nitrate as per today.

It is of great interest to combine urea and ammonium nitrate into a solid blend, mainly to get various sorts of nitrogen ($NH_4^+$, $NO_3^-$, N-urea) into a high concentrated N fertilizer in solid form.

Improved safety of nitrate-based fertilizers is also of major interest. Both general safety aspects and production of a fertilizer from which nitrate cannot be easily isolated from other components for misuse purposes are of interest. For example if we refer to CAN: filler can be extracted from CAN to obtain pure AN by for example dilution in water, settling of the filler, then evaporation/concentration of the liquid phase. On the other hand, since both components are water-soluble, such operations are not possible with urea-ammonium nitrate blends.

It is of importance to be able to produce a safe and high concentrated N fertilizer, comprising large amount of nitrate, providing right ratios of urea to AN. Ammonium nitrate is a well-known strong oxidizer, presenting specific hazards and, under certain conditions, explosive properties. Accidents may happen, especially when ammonium nitrate fertilizer is polluted with contaminants (organics, chloride, etc) and involved in a fire (farm storage, truck accident, etc). In addition ammonium nitrate fertilizers can be misused as explosives. Therefore, many countries have made strict regulation on ammonium nitrate based fertilizers, in particular in terms of N content. Pure ammonium nitrate has a theoretical nitrogen content of 35% N, its commercial grade usually vary from about 20% N to about 34.5% N depending on local legislation relative to safety. While pure urea has theoretical nitrogen content of 46.6% N, and its commercial grade usually is 46% N, or 45% N at least.

It appears that extra dilution of AN when producing CAN, can lead to uneconomical competition to urea, even if ammonium nitrate is considered agronomical superior.

Blended products described according to the present invention overpass this question, making available a high nitrogen grade fertilizer comprising large proportion of AN while being particularly safe. This safety aspect is however to be strictly controlled, as a minimum amount of urea added to the blend is required to ensure good properties. If too low, it may even enhance the risk. Indeed, ammonium nitrate explodes the better if the oxygen balance is respected, as typically when one adds ~6% fuel oil in ammonium nitrate to obtain e.g. ANFO (ammonium nitrate fuel oil), one of the most common civil explosive used throughout the world.

In case of urea-ammonium nitrate mixtures, a ratio of 1 to 4 between urea and ammonium nitrate (i.e. ~20% urea mixed with ~80% ammonium nitrate) corresponds in fact to an equilibrated oxygen balance, which creates a safety concern. See examples in the text below, as well as for example the Statement of J. Edmund Hay from U.S. Bureau of Mines before the Committee on the Judiciary U.S. House of Representatives on Jun. 13, 1995, and the relative work performed by the US Bureau of Mines.

On the contrary, a mixture of 50/50 is far from right explosion properties and is especially safe material, as it cannot be sensitized by adding fuel oil nor easily separated by e.g. dissolution in water. Denting tests (see for example IFS n°124) as well as large explosion tests have been performed to confirm the good behaviour of such blends to explosion sensitivity. Denting test being used as a screening test: what explodes at such a small scale will explode at larger scale, thus the interest of 2 to 8" tube test to take into account the influence of the critical diameter and confirm the safe behaviour of the unexploded ones at small scale.

Addition of other components such as fillers such as e.g. dolomite, helps for further stabilization, as they are not explosive. The presence of some dolomite or calcium carbonates material help stabilization of such blend when involved in a fire, just the same effect as CAN or AN33.5 with some dolomite versus pure AN.

The invention is further illustrated by the following non-limiting examples.

EXAMPLES

All the blends were prepared using weight proportions 50/50 in weight between the urea-based product and AN-based product. Urea-based products tested: granular urea and UAS, characterized here-in-under by their nitrogen content (N) expressed in weight %. AN based product were either AN33.5 or CAN27, granular products, either unstabilized or stabilized with magnesium nitrate.

Example 1

Urea granules and CAN granules were mixed in proportion 50/50 in a cup, and then let at open atmosphere in the lab. After just a few hours, the blend had turned into a liquid solution as known from the literature.

Cup: alumina, diameter 8 cm, depth 2 cm with 20 g of CAN and 20 g of urea.

Example 2

Standard urea was blended 50/50 with unstabilized CAN granules and bagged. Lumps appeared after a few days while stored at room temperature.

Example 3

Standard urea granules and CAN granules stabilized with magnesium nitrate were blended in proportion 50/50 at lab scale, in a cup as per example 1, bagged, and then stored for one week at lab temperature. After one week the blend remained free flowing. The bag, still closed, was then submitted to thermocycling test between room temperature and oven at 50° C. The blend could not withstand the treatment and turned into mud and lumps.

Example 4

UAS grades of 45, 42 and 40% N were granulated in a fluidized bed granulator, containing respectively 5, 15 and 23% of AS added into urea. They were bagged together with CAN stabilized with magnesium nitrate and submitted to thermocycling test between room temperature and oven at 50° C. The blend with UAS containing 45% N turned totally liquid, the one with UAS containing 42% N partially turned partially to liquid, while the one with UAS containing 40% N remained correct. UAS containing 42% N is boarder line to get the relevant effect if temperature can rise as high as 50 deg C. during the storage process.

Example 5

Urea granules were fattened (coated) in a fluidized bed granulator with 20% wt of UAS containing respectively 42% N and 40% N, thus producing urea granules converted into fattened granule of high N content of respectively 45.2% and 44.8%. They were bagged together with AN stabilized with magnesium nitrate and submitted to thermocycling test between room temperature and oven at 50 deg C. The blend with UAS containing 42% N turned partially liquid, while the one with UAS containing 40% N remained correct to nearly correct. This shows the importance of the quality of the fattening.

Example 6

CAN-Mg and a UAS(40% N)/CAN-Mg blend (400 g each) were exposed to an atmosphere controlled at 90% relative humidity and 20° C. for three hours. First product was used as reference, CAN 27 stabilized with magnesium nitrate. It picked up 0.5% moisture (measured by Karl Fisher) while remaining the dry outlook.

The second product was a blend 50% of same CAN blended with 50% UAS containing 40% N. It picked up 0.35% water only and also remained a dry outlook. The caking index was 20% lower than for the standard CAN stabilized with magnesium nitrate.

The caking tendency of fertilizer is the force (kgf) required to break a cake of compressed fertilizer. The compression of the sample was performed at a well-defined temperature, force and in a well-defined period. In a mould the sample is put under a pressure of 2 bar for 24 hours, in a temperature controlled room at 27° C. Then the caked sample is put under the piston and the pressure is increased at the rate of 0.1 bar/5 sec (or 8 kgf/5 sec) until breaking occurs. This breaking pressure is known as the caking index.

Explosion Tests

Detonation tests were carried out in steel tubes with a diameter of 100 mm according to EU regulations, but also with larger diameters such as 200 mm in order to study more accurately the differences between the compositions Blends of granules passed the tests, therefore crushed urea based product and fines from porous ammonium nitrate were used instead of normal granular products, making the test even tougher to pass through. The primer used was plastic explosive, 1750 g in case of tubes of 200 mm diameter. Intensive tests were conducted, some of the most relevant presented hereunder as examples:

Example 7

80% of fines from porous ammonium nitrate with size below 1 mm were blended with 20% of a UAS containing 40% N product. The use of fines is more stringent and the test more discriminant. Use of granules instead of fines/dust would lead to less detonable mixtures. Using fines is also interesting in order to simulate degraded product as explosions might sometimes happen during normal handling of fertilizers.

It was used a steel tube of 70 mm diameter, length 600 mm, primed with 125 g plastic primer. Explosion was stable at 2450 m/s and the tube was fully fragmented. This test confirmed data from literature indicating that a mix of approximately 20% urea-80% AN would be explosive. Since it already exploded, it was no need to test larger tubes. (the larger the tube, the better the explosion. Concept of critical diameter)

Example 8

60% fines from porous ammonium nitrate (size below 1 mm) was blended with a UAS containing 40% N product (approx. 80% urea-20% AS).

For the test it was used a steel tube 100 mm diameter, 5 mm thickness, 100 cm long (same as for EU test) primed with 375 g plastic explosive. Explosion faded and 40 cm of steel tube remained undamaged. This shows that this fertilizer is safe.

Compositions with less AN more urea/UAS will therefore also be safe.

Example 9

50% of fines from porous ammonium nitrate blended with UAS containing 40% N product:

Steel tube 200 mm diameter, 6 mm thickness, 100 cm long, primed with 1750 plastic primer. The explosion faded and about 40 cm of the tube remained undamaged. This shows that the fertilizer is safe.

The invention claimed is:
1. A solid blend comprising urea based particles and ammonium nitrate based particles,
wherein the ammonium nitrate based particles comprise salts able to bind crystallization water, and the urea based particles comprise ammonium sulphate, and
wherein the parts of the urea based particles comprising ammonium sulphate, which are in contact with the ammonium nitrate based particles, contain 42% N or less.
2. The blend according to claim 1,
wherein the salt is selected from the group consisting of magnesium nitrate, magnesium sulphate, aluminium sulphate and mixtures thereof.
3. The blend according to claim 1, wherein the salt amount is 0.1-50 weight % of the ammonium nitrate based particles.
4. The blend according to claim 1,
wherein the ammonium sulphate in the urea particles comprising ammonium sulphate is distributed in the mass of the particle.
5. The blend according to claim 1,
wherein the urea particles comprising ammonium sulphate have an external layer of urea ammonium sulphate.
6. The blend according to claim 1, comprising more than 40 weight % of urea particles comprising ammonium sulphate.
7. The blend according to claim 1,
further comprising a colouring agent, wherein the colouring agent is distributed throughout the particles and/or is external at the surface of the particles.
8. The blend according to claim 1,
wherein the urea based particles and the ammonium nitrate based particles have a similar size and particle size distribution, and particle density within the same range.
9. The blend according to claim 3, wherein the salt amount is 0.5-3 weight % of the ammonium nitrate based particles.
10. A process for the manufacturing of a solid blend according to claim 1, the process comprising the steps of
ia) mixing ammonium sulphate with urea, and forming urea based particles having ammonium sulphate distributed throughout the particles; or
ib) forming urea based particles comprising an external layer comprising ammonium sulphate; and
ii) mixing a salt, able to bind crystallization water, with an ammonium nitrate source and forming ammonium nitrate based particles comprising said salt; and
iii) blending the particles of step ia) and/or ib) and ii), wherein the parts of the urea based particles comprising ammonium sulphate, which are in contact with the ammonium nitrate based particles, contain 42% N or less.
11. A process according to claim 10, wherein the salt is selected from the group consisting of magnesium nitrate, magnesium sulphate, aluminium sulphate and mixtures thereof.

* * * * *